United States Patent
Kim (10) Patent No.: US 7,173,888 B2
(45) Date of Patent: Feb. 6, 2007

(54) RECORDING APPARATUS FOR AND METHOD OF IMPROVING OVERWRITE CHARACTERISTICS

(75) Inventor: Seong-sue Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 674 days.

(21) Appl. No.: 10/457,818

(22) Filed: Jun. 10, 2003

(65) Prior Publication Data

US 2004/0257957 A1    Dec. 23, 2004

(30) Foreign Application Priority Data

Jun. 10, 2002   (KR)   ............ 10-2002-0032336

(51) Int. Cl.
*G11B 7/00*   (2006.01)

(52) U.S. Cl. ............... 369/44.23; 369/44.37; 369/47.1; 369/112.23

(58) Field of Classification Search ............ None
See application file for complete search history.

(56) References Cited

U.S. PATENT DOCUMENTS 5,541,900 A * 7/1996 Ito et al. ............ 369/44.31

FOREIGN PATENT DOCUMENTS

| JP | 63-304428 | 12/1988 |
|----|-----------|---------|
| JP | 5-54414 | 5/1993 |
| JP | 10-233032 | 9/1998 |
| JP | 2001-184676 | 7/2001 |
| JP | 2001-307365 | 11/2001 |

OTHER PUBLICATIONS

Office Action issued in Japanese Patent Application No. 2003-148247 on Apr. 18, 2006.

* cited by examiner

*Primary Examiner*—Muhammad Edun
(74) *Attorney, Agent, or Firm*—Stein, McEwen & Bui, LLP (57) ABSTRACT

A recording apparatus and method for recording a mark on a recordable recording medium includes an optical pickup having a light source and an objective lens for focusing light emitted from the light source as a light spot on a recording surface of a recording medium. When recording on a rewritable recording medium, the size of the light spot formed on the recording surface of a recording medium is increased more than when recording on a write once recording medium and/or reproducing from a recording medium. Accordingly, when recording on a rewritable recording medium, the size of a light spot is enlarged more than when recording on an only once writable recoding medium and/or reproducing from a recording medium. Thus, when a mark is recorded on the rewritable recording medium, the erasing rate of an existing recorded phase-change mark is increased to improve the overwriting characteristics.

37 Claims, 10 Drawing Sheets

RECORDING APPARATUS FOR AND METHOD OF IMPROVING OVERWRITE CHARACTERISTICS

CROSS-REFERENCE TO RELATED APPLICATION

This application claims the benefit of Korean Patent Application No. 2002-32336, filed on Jun. 10, 2002 in the Korean Intellectual Property Office, the disclosure of which is incorporated herein in its entirety by reference.

BACKGROUND OF THE INVENTION

1. Field of the Invention

The present invention relates to a recording apparatus and method, and more particularly, to a recording apparatus for and method of improving overwrite characteristics when a mark is recorded on a rewritable medium.

2. Description of the Related Art

Rewritable recording media include write-once recording media, such as CD-Rs, DVD-Rs, and rewritable recording media, such as CD-RWs, DVD-RWs, DVD+RWs, and DVD-RAMs. Rewriting is performed on rewritable recording media, such as phase-change recording media, according to a method of overwriting a new phase-change mark in an area in which a phase-change mark is already written.

Figure 1:
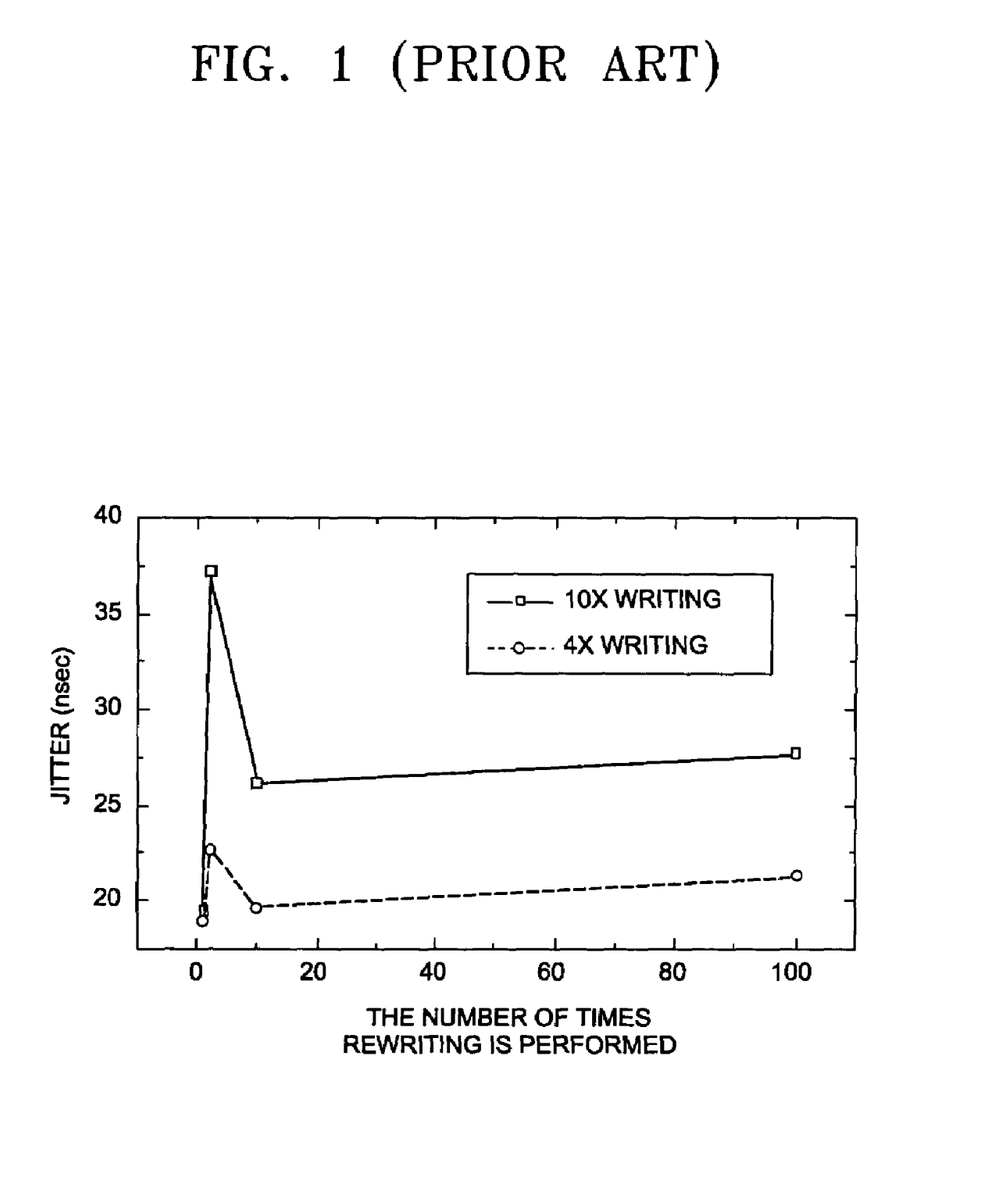
FIG. 1 is a graph illustrating jitter measured based on the number of times overwriting is performed on a CD-RW optical disc for a speed factor of 10 (10×) at speed factors of 4 and 10 (4× and 10×)

FIG. 1 illustrates a jitter characteristic measured based on the number of times overwriting is performed on a CD-RW optical disc for a speed factor of 10 (10×) at speed factors of 4 and 10 (4× and 10×). In FIG. 1, the horizontal axis denotes the number of times overwriting is performed, and the vertical axis denotes the jitter characteristic with respect to overwriting. FIG. 1 shows the result of the measurement of jitter of the phase-change mark according to the number of times overwriting at the speed of a speed factor 1, and when a pulse width of 1T is 220 nsec at the speed factor of 1. Jitter refers to a deviation in a pulse width corresponding to the length of a recording mark with respect to a standard pulse width. Thus, as shown in FIG. 1, jitter can be expressed in nsec.

As seen in FIG. 1, when overwriting is performed on a CD-RW optical disc at a speed factor of 10×, the jitter occurring when writing is performed twice increases by 19 nsec as compared with jitter occurring when writing is performed once. The increase in the jitter occurs because an already recorded phase-change mark is not completely removed. The increase in jitter is a factor due to which data cannot be reproduced.

SUMMARY OF THE INVENTION

The present invention provides a recording apparatus and method for improving overwrite characteristics by increasing an erasing rate of an existing phase-change mark when a mark is recorded on a rewritable recording media.

Additional aspects and/or advantages of the invention will be set forth in part in the description which follows and, in part, will be obvious from the description, or may be learned by practice of the invention.

According to an aspect of the present invention, a recording apparatus for recording a mark on a recordable recording medium includes an optical pickup having a light source to emit light and an objective lens to focus the emitted light as a light spot on a recording surface of a recording medium, wherein, when recording on a rewritable recording medium, a size of the light spot formed on the recording surface of a recording medium is increased to be larger than a size of a light spot when recording on a write-once recording medium and/or reproducing from a recording medium having a same thickness as the rewritable recording medium.

According to another aspect, the optical pickup includes a light spot size adjuster and a controller, where the light spot size adjuster changes a size of the light spot formed on the recording surface of a recording medium, and the controller controls the light spot size controller so that, when recording on the rewritable recording medium, the size of the light spot is increased to be more than the size when recording on the write once recording medium and/or when reproducing from a recording medium having a same thickness as the rewritable recording medium.

According to a further aspect, the light spot size adjuster is combined with the objective lens to form a single body.

According to an additional aspect, the light spot size adjuster uses a liquid crystal to adjust the size of the light spot by adjusting the transmittance of the liquid crystal to change an effective numerical aperture of the objective lens.

According to still another aspect, the light spot size adjuster has a structure in which the liquid crystal is applied only at a position corresponding to a periphery of the objective lens and electrodes are connected to the position to apply a current to the liquid crystal so as to change the effective numerical aperture of the objective lens.

According to a still further aspect, the objective lens is formed to change the size of the light spot formed on the recording surface of a recording medium, and the apparatus further includes a controller which controls the objective lens so that, when recording on the rewritable recording medium, the size of the light spot is increased to be larger than a size when recording on the write once recording medium and/or reproducing from a predetermined recording medium having a same thickness as the rewritable recording medium.

According to a still additional aspect, when recording on the rewritable recording medium, the objective lens is defocused to increase the size of the light spot.

According to yet another aspect, the rewritable recording medium is a phase-change recording medium.

According to a yet further aspect, the rewritable recording medium is one of a CD-RW, a DVD-RW, a DVD+RW, a DVD-RAM, and a write once or a write more than once recordable next generation DVD having higher density than a DVD.

According to another aspect of the present invention, a method of recording on a rewritable recording medium by using an optical pickup having a light source and an objective lens for focusing light emitted from the light source as a light spot on a recording surface of a recording medium includes increasing the size of the light spot formed on the recording surface of the rewritable recording medium to be more than the size of a light spot when recording on a write once recording medium and/or reproducing from a recording medium having a same thickness as the rewritable recording medium.

According to another aspect, the rewritable recording medium is a phase-change recording medium.

According to a further aspect, the rewritable recording medium is one a CD-RW, a DVD-RW, a DVD+RW, a DVD-RAM, and a write once or a rewritable next generation DVD having a higher density than the DVD.

BRIEF DESCRIPTION OF THE DRAWINGS

The above and/or other features and advantages of the present invention will become more apparent and be better appreciated by describing in detail exemplary embodiments thereof with reference to the accompanying drawings in which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
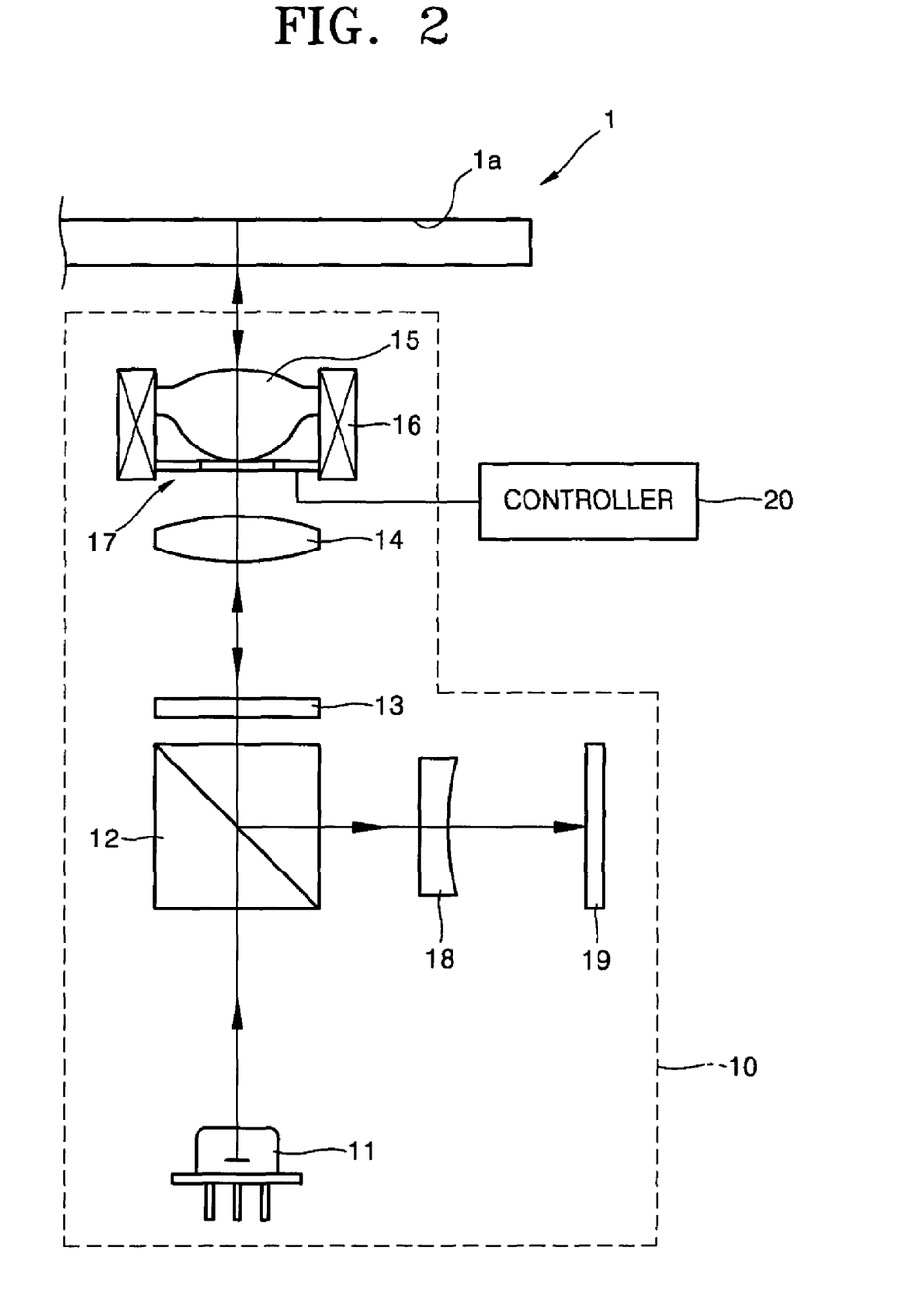
FIG. 2 is a schematic view of a recording apparatus using an optical pickup according to an embodiment of the present invention.

FIG. 2 is a schematic view of a recording apparatus using an optical pickup 10 according to an embodiment of the present invention. Referring to FIG. 2, the recording apparatus includes an optical pickup 10 having a light source 11, an objective lens 15, and a light spot size adjuster 17, and a controller 20. The objective lens 15 focuses light emitted from the light source 11 as a light spot on a recording surface 1a of a recording medium 1. The light spot size adjuster 17 changes the size of the light spot focused on the recording surface 1a of the recording medium 1. The controller 20 controls the light spot size adjuster 17 to adjust the size of the light spot.

It is preferable, but not required, that the light spot size adjuster 17 is mounted together with the objective lens 15 in an actuator 16, which controls the objective lens 15 in a focusing direction, a tracking direction, or the like. This combination has the center of the light spot size adjuster 17 coinciding with the central axis of the objective lens 15. However, it is understood that other orientations and combinations can be used.

In FIG. 2, the light spot size adjuster 17 is installed apart from the objective lens 15. However, it is understood that the light spot size adjuster 17 may be installed on one lens surface of the objective lens 15, and preferably, a lens surface facing the light source 11 so as to form a single body.

Figure 3:
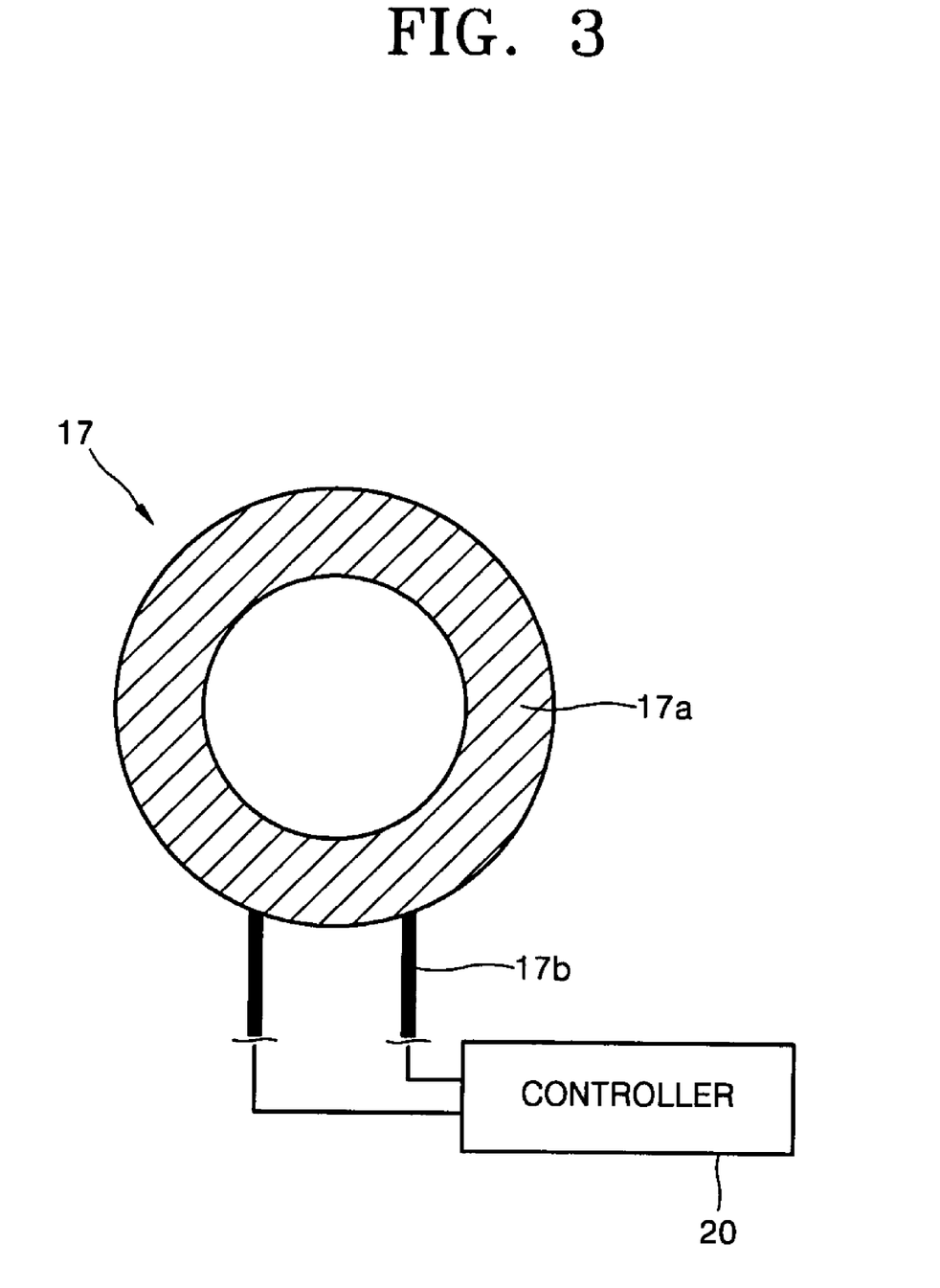
FIG. 3 is a schematic plan view of an embodiment of a light spot size adjuster of FIG. 2.

According to an aspect of the invention, the light spot size adjuster 17 changes an effective numerical aperture (NA) of the objective lens 15 by controlling the transmittance of a liquid crystal so as to adjust the size of the light spot focused on the recording surface 1a of the recording medium 1. As shown in more detail in FIG. 3, an example of the light spot size adjuster 17 has a liquid crystal area 17a. Electrodes 17b are connected at a peripheral area of the objective lens 15 to change the effective NA of the objective lens 15. The controller 20 controls the light spot size adjuster 17 so that, during recording on a rewritable recording medium (i.e., a phase-change recording medium), the size of the light spot focused on the recording surface 1a of the recording media 1 is increased to be more than the size during recording on a write once recording medium and reproducing from a recording medium (i.e., a medium having a same thickness as the rewritable and write once recording media).

Figure 4:
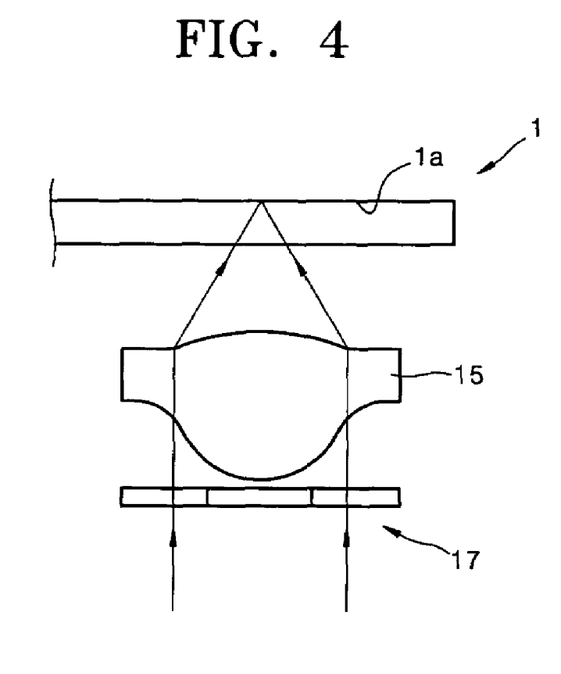
FIG. 4 shows the light spot size controller forming a small light spot and a width of light proceeding during reproducing of a recording medium and recording on a write once recording medium.
Figure 5:
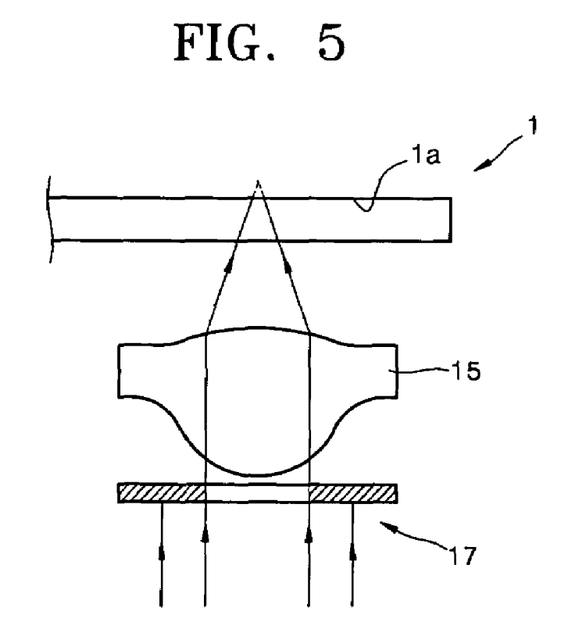
FIG. 5 shows the light spot size controller forming a large light spot, and the variation of the width of the light when a mark is recorded on a rewritable recording media.

As shown in FIG. 4, the controller 20 applies a voltage to the liquid crystal area 17a so that the transmittance of the liquid crystal is at a maximum to have a high effective NA during reproduction from the recording medium 1 and while recording on the write-once recording medium. Also, as shown in FIG. 5, during recording on the rewritable recording medium, the controller 20 applies a voltage to the liquid crystal area 17a so that the transmittance of the liquid crystal is at a minimum to have a low effective NA.

As described above, where the voltage is applied to the light spot size adjuster 17, which is of a liquid crystal type, the optical pickup 10 forms a light spot having a minimum size on the recording surface 1a of the recording medium 1 during reproducing from a recording medium (i.e., a recording medium having a same thickness as the write once and rewritable recording media) and recording on a write once recording medium. Also, when recording on a rewritable recording medium, the size of the light spot formed on the recording surface 1a of the recording medium 1 is increased more than the size when reproducing from the recording medium and recording on the write once recording medium.

Where the size of the light spot is increased when recording on a rewritable recording medium, overwriting characteristics are improved due to the follow reasons. If overwriting is carried out on a phase-change recording medium, an existing mark is erased therefrom and a new mark is written thereon. The erasing rate of the existing mark increases as the temperature at which erasing occurred is maintained for a long period of time.

Assuming that the power of the light per unit area radiated onto the recording surface 1a of the recording medium 1 when using a recording method of the present invention is equal to the power of the light radiated when an existing recording method is applied or corresponds to the temperature at which erasing occurs. In this case, the area of light radiated when the recording method of the present invention is applied is wider than the area of light radiated when the existing recording method is applied. Thus, the temperature at which erasing is performed is maintained for a longer period of time than when the existing method is used.

Accordingly, when recorded on a rewritable recording medium by increasing the size of a light spot, the erasing rate of a mark increases more than the erasing rate of a mark written by applying an existing recording method. Thus, the overwriting characteristics of a phase-change recording medium are improved.

Here, the existing recording method refers to a recording method by which the size of a light spot formed to record on a rewritable recording medium is equal to the size of a light spot formed to reproduce and/or record with respect to a recording media having a same thickness as the rewritable recording medium.

Figure 6:
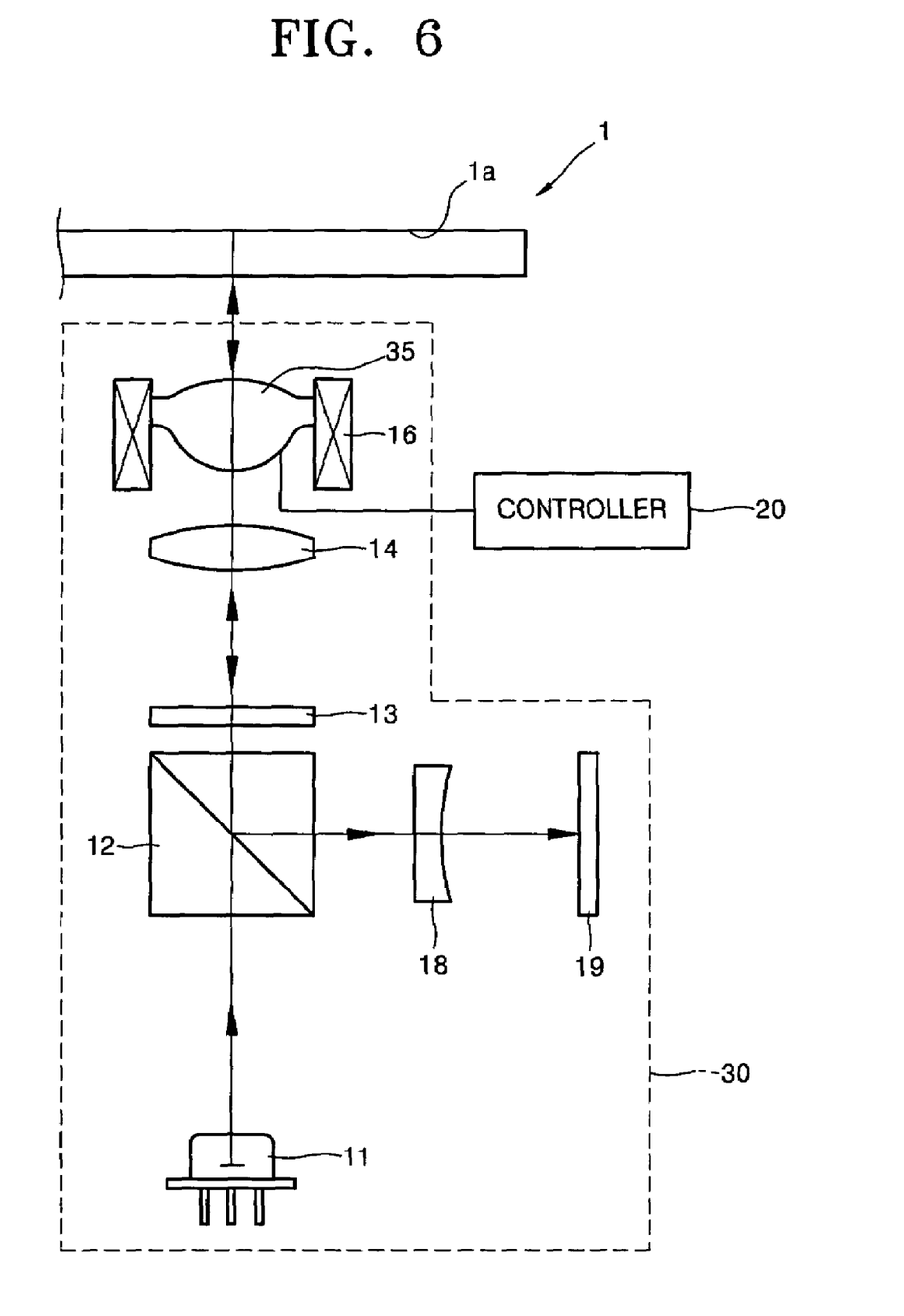
FIG. 6 is a schematic view of a recording apparatus using an optical pickup according to another embodiment of the present invention.

Referring to the embodiment shown in FIG. 6, the optical pickup 30 does not include the light spot size adjuster 17 shown in FIG. 2. Instead, the objective lens 35 is able to adjust the size of the light spot. For example, when the objective lens 35 includes a liquid crystal to adjust the size of the effective NA by applying a voltage, the effective NA is changed by adjusting the size of the NA of the objective lens 35 (i.e., the liquid crystal lens). The liquid crystal is controlled by a controller 20 such that the size of the light spot is variable.

Figure 7:
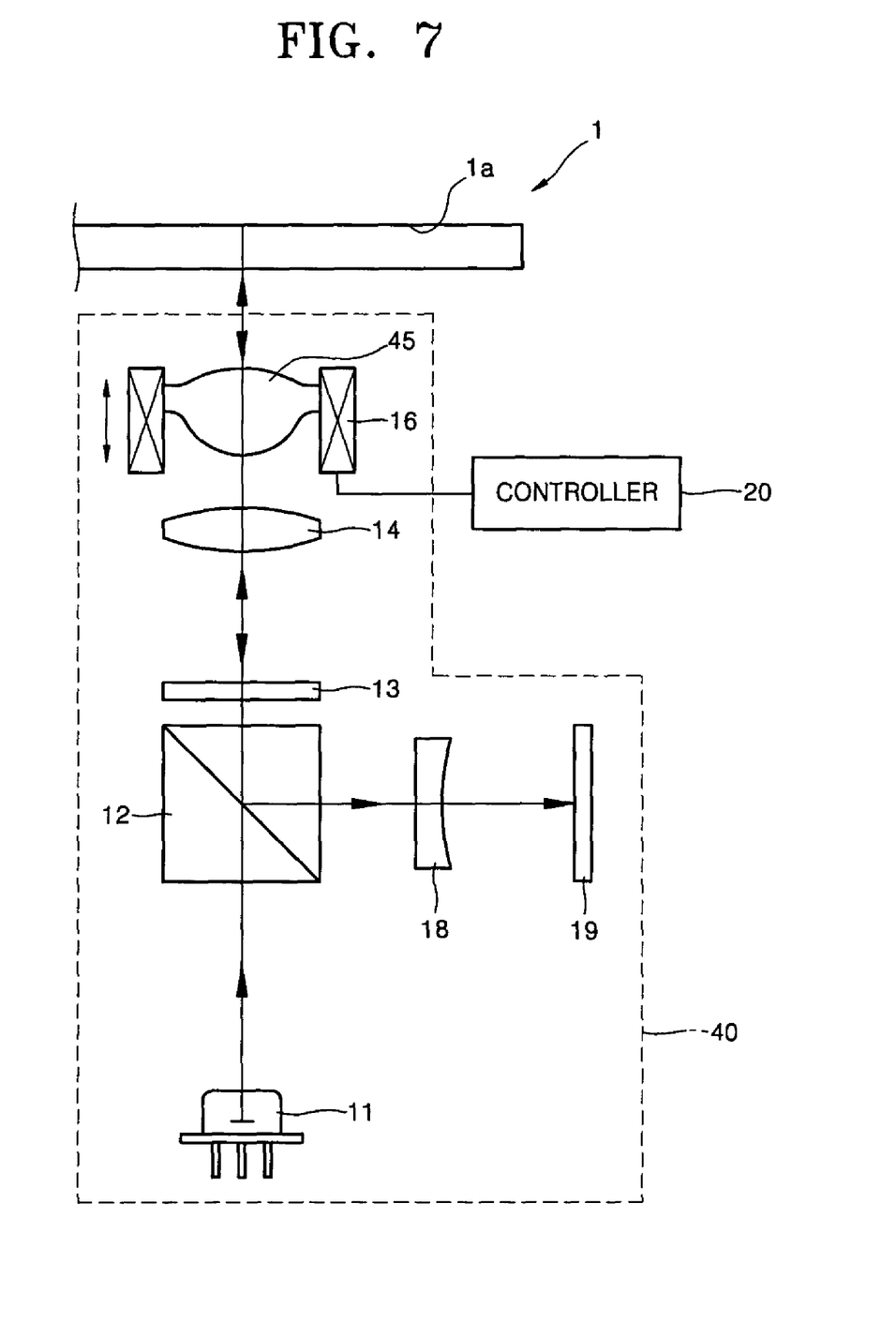
FIG. 7 is a schematic view of a recording apparatus using an optical pickup according to still another embodiment of the present invention.

Referring to the embodiment shown in FIG. 7, the optical pickup 40 has a general structure in which an additional light spot size adjuster 17 of FIG. 2 is not installed. Instead, when recording is performed on a rewritable recording media, the controller 20 controls an actuator 16 to defocus objective lens 45 so that the size of the light spot is enlarged.

As shown in FIGS. 2, 6, and 7, each of the optical pickups 10, 30, and 40 used in the recording apparatus according to the present invention includes an optical path changing unit, a collimating lens 14, and a photodetector 19. The optical path changing unit selectively changes an optical path of light emitted from the light source 11. The collimating lens 14 changes divergent light emitted from the light source 11 to parallel light. The photodetector 19 receives light that is reflected on the recording surface 1a of the recording medium 1 and is incident via the objective lens 35 and the optical path changing unit to detect an information signal and/or an error signal.

The light source 11 may comprise a semiconductor laser, which emits light having a predetermined wavelength. When the recording apparatus according to the present invention is suitable for a CD-family optical disc, the light source 11 emits light having a wavelength of 780 nm. When the recording apparatus is suitable for a DVD-family optical disc, the light source 11 emits light having a red wavelength (e.g., light having a wavelength of 650 nm). When the recording apparatus is suitable for a next generation DVD-family optical disc, the light source 11 emits light having a blue wavelength (e.g., light having a wavelength of 405 nm).

According to an aspect of the invention, the optical path changing unit comprises a polarizing light beam splitter 12, which transmits or reflects incident light according to the state of polarization, and a wave plate 13, which changes the polarization of incident light. While not required, the wave plate 13 is a quarter wave plate for the wavelength of light emitted from the light source 11. Alternatively, the optical path changing unit comprises a beam splitter, which transmits and reflects incident light at a predetermined ratio.

In FIGS. 2, 6, and 7, the apparatus includes a sensing lens 18 to increase the size of a beam, which is reflected on the recording surface 1a of the recording medium 1 and goes toward the photodetector 19, so that the photodetector 19 receives the beam. Where the optical pickups 10, 30, and 40 detect a focusing error signal according to an astigmatic method, the sensing lens 18 may include an astigmatic lens or may further include an additional astigmatic lens.

Here, it is understood that the optical configurations of the optical pickups 10, 30, and 40 are not limited to the configurations shown in FIGS. 2, 6, and 7, and may be variously modified. For instance, it is possible to use multiple light sources to allow compatibility with multiple families of recording media.

The recording apparatus according to the present invention records a mark on a recordable medium or reproduces a mark or a pit written on a predetermined recording medium. When recording on a rewritable medium, the recording apparatus enlarges the size of a light spot formed on a recording surface of the recording medium as compared to when recording on a write once writable medium and/or reproducing from a recording medium of the same family.

Figure 8:
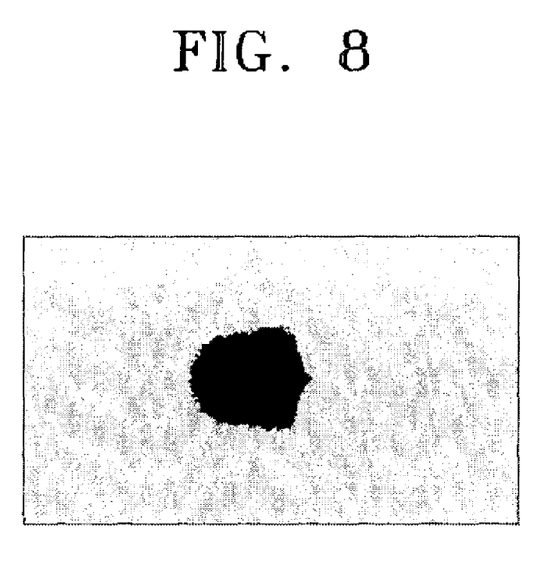
FIG. 8 shows a phase-change mark corresponding to a 3T mark recorded on a 10× CD-RW optical disc.
Figure 9:
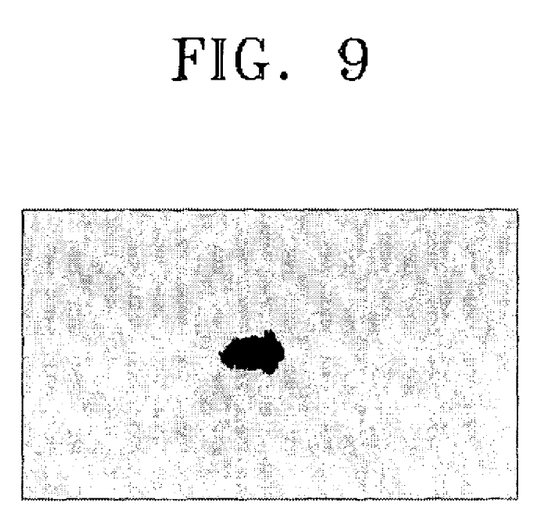
FIGS. 9 through 14 show the result of erasing of the mark of FIG. 8 by using light spots formed to sizes of 262 nm, 267 nm, 279 nm, 300 nm, 350 nm, and 450 nm in full width half maximum (FWHM) mode.
Figure 10:
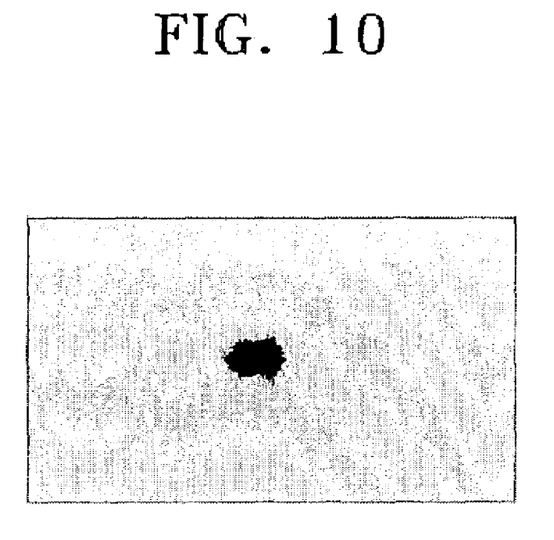
Figure 11:
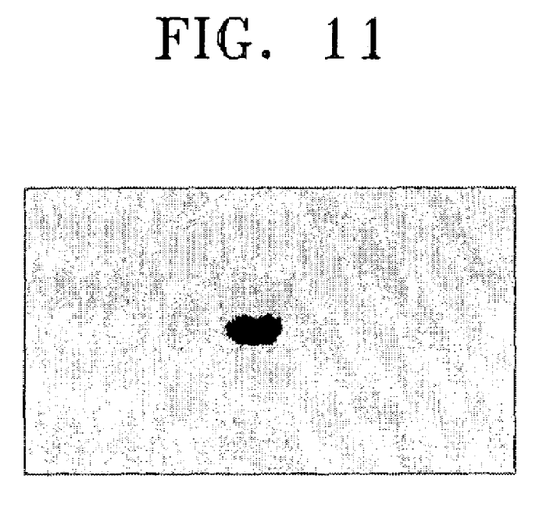
Figure 12:
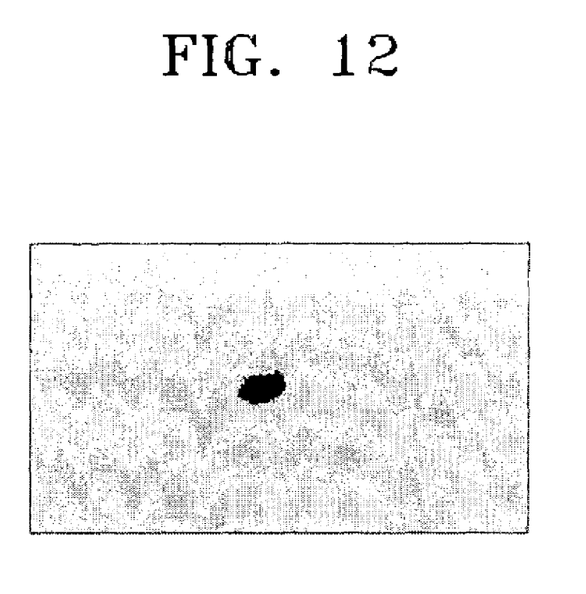
Figure 13:
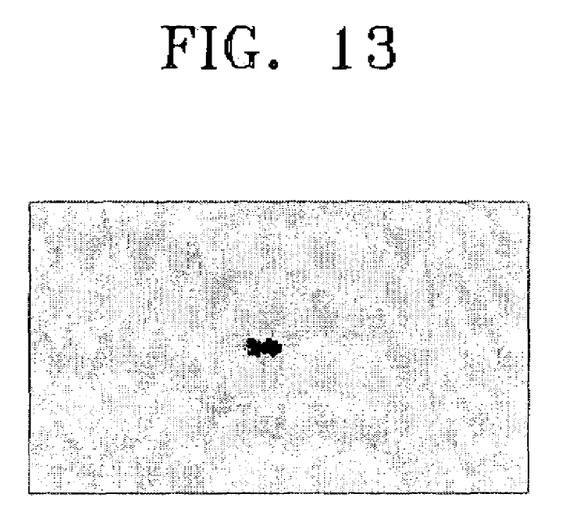
Figure 14:
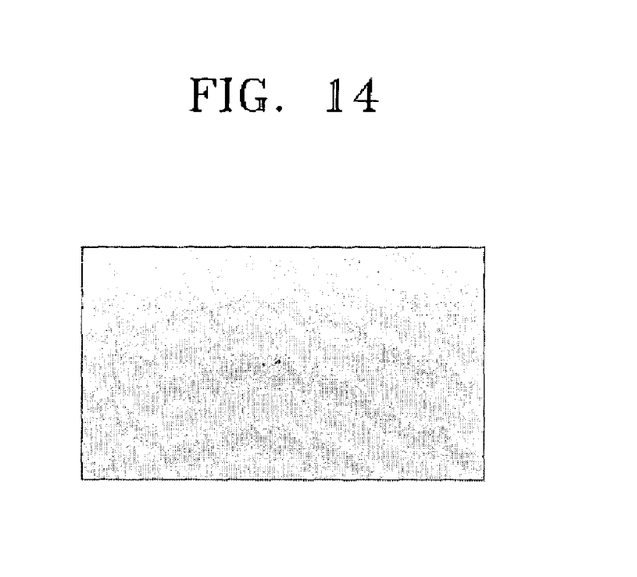
Figure 15:
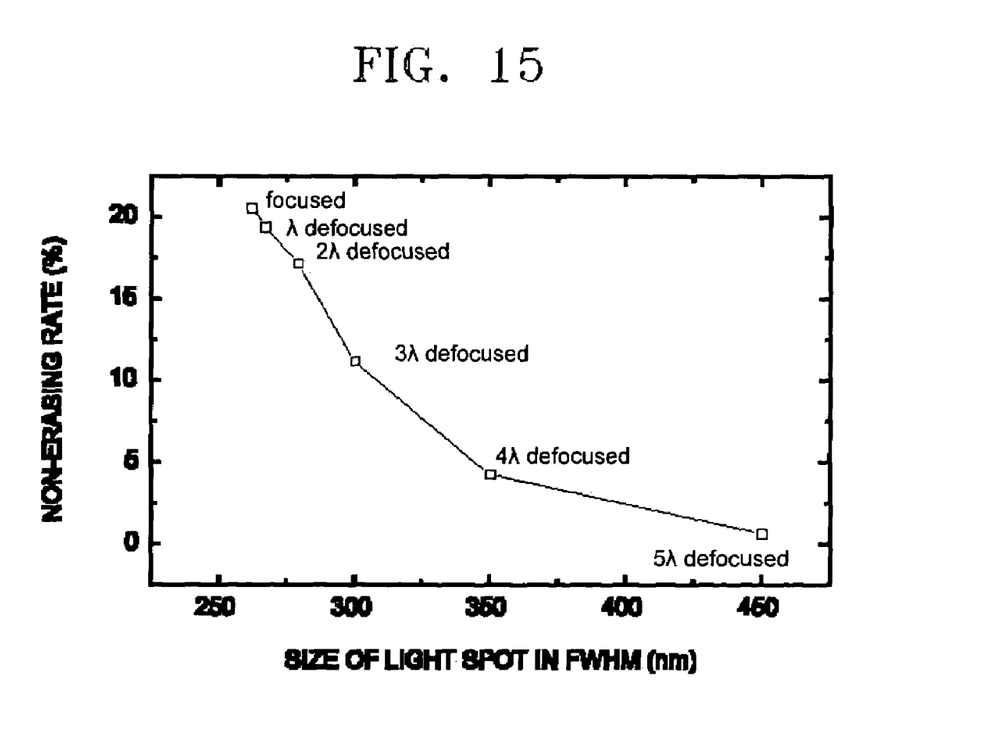
FIG. 15 is a view illustrating the result obtained by dividing the size of the remaining portion of the mark after erasure, shown in FIGS. 9 through 14 by the size of the mark shown in FIG. 8 together with the amount of defocused light necessary for obtaining the light spots of sizes of 262 nm, 267 nm, 279 nm, 300 nm, 350 nm, and 450 nm in the FWHM mode.

Hereinafter, the capability of improving the overwriting characteristics of a rewritable phase-change recording medium according to the present invention will be described with reference to FIGS. 8 through 15. FIG. 8 shows a phase-change mark corresponding to a 3T duration ("T" represents a reference clock period) recorded on a 10× CD-RW optical disc. FIGS. 9 through 14 show the result of erasing the mark of FIG. 8 by forming light spots each having sizes of 262 nm, 267 nm, 279 nm, 300 nm, 350 nm, and 450 nm in FWHM. FIG. 15 graphically shows the result obtained by dividing the size of the remaining mark shown in FIGS. 9 through 14 after erasing the mark shown in FIG. 8 using the light spots each having sizes 262 nm, 267 nm, 279 nm, 300 nm, 350 nm, and 450 nm in FWHM by the size of the mark shown in FIG. 8 before erasing. FIG. 15 further illustrates the amount of defocused light necessary for obtaining light spots each having sizes of 262 nm, 267 nm, 279 nm, 300 nm, 350 nm, and 450 nm in FWHM.

A change in the size of the light spot can be obtained by changing the effective NA of the objective lens and/or by defocusing the objective lens 35. As the effective NA is reduced, the distance of a focal point of light focused by the objective lens 35 gets longer. Thus, the change in the effective NA and the defocusing of the objective lens 35 may be expressed by the amount of defocused light.

As seen in FIG. 15, the size 262 nm of the light spot is obtained when the amount of defocused light spot is zero (i.e., the light spot is focused) since the effective NA is equal to the case of recording on a write once writable recording medium or the objective lens 35 is not defocused. Also, the sizes 267 nm, 279 nm, 300 nm, 350 nm, and 450 nm are obtained when the light spot is defocused by $\lambda$, $2\lambda$, $3\lambda$, $4\lambda$, and $5\lambda$, respectively. As seen in FIGS. 8 through 14, as the size of the light spot increases, the size of the remaining portion of the mark after being erased is reduced. This can be confirmed from the graph shown in FIG. 15.

The above-described experiment illustrates that the overwriting characteristics may be improved by increasing the erasing rate of a mark. The recording method according to the present invention can be applied to optical discs having multiple formats when the optical disc is a phase-change recording medium as a CD-RW. In other words, the recording method according to the present invention can be applied to record a phase-change mark on various types of rewritable recording media, including, but not limited to, CD-RWs, DVD-RWs, DVD+RWs, DVD-RAMs, and write once rewritable next generation DVDs having higher density than DVDs. Here, the next generation DVDs refer to high capacity recording media having 20 GB or more storage capacity to store information, such as high definition moving pictures and is being currently standardized. Examples of the next generation DVDs are Blu-ray discs and Advanced Optical Discs (AOD).

As described above, a recording apparatus according to the present invention can record on a write once recording medium as well as on a rewritable medium. Also, the recording apparatus can reproduce from a predetermined recording medium (i.e., a write once recording medium, a rewritable medium, and a reproduction only recording medium). The write once recording medium may be a CD-R, a DVD-R, or a write once next generation DVD. The reproduction only recording medium may be a CD-ROM, a DVD-ROM, or a reproduction only next generation DVD.

The above-described recording apparatus according to the present invention can be applied to record a mark on and/or reproduce recorded information from at least one of a CD-family optical disc, a DVD-family optical disc, or a next generation DVD-family optical disc.

As described above, according to the present invention, when recording on a rewritable recording medium, the size of a light spot is enlarged to be more than the size when recording on a write once recording medium and/or reproducing from a recording medium of the same family. Thus, when a mark is recorded on the rewritable recording medium, the erasing rate of an existing recorded phase-change mark is increased to improve the overwriting characteristics.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A recording apparatus for recording and/or reproducing a mark on a recording medium family, the apparatus comprising:
    an optical pickup having a light source to emit a light beam and an objective lens to focus the emitted light beam to form a light spot on a recording surface of the recording medium, the optical pickup being controllable to change a size of the light spot formed on the recording surface; and
    a controller to control the optical pickup such that, when recording on a rewritable recording medium, the optical pickup forms a first size light spot on the recording surface that is larger than a second size light spot, where the second size light spot is formed when recording on a write once recording medium and/or reproducing from the recording medium family,
    wherein the recording medium family comprises any recording media having a common thickness with the rewriteable recording medium.

2. The recording apparatus of claim 1, wherein the optical pickup further comprises:
    a light spot size adjuster that is controllable to change the size of the light spot to be one of the first and second sizes; and
    the controller controls the light spot size controller to be one of the first and second sizes.

3. The recording apparatus of claim 2, wherein the light spot size adjuster is disposed on the objective lens to form a single body.

4. The recording apparatus of claim 3, wherein the light spot size adjuster comprises a liquid crystal having an adjustable transmittance, and the controller adjusts the transmittance of the liquid crystal to adjust the size of the light spot so as to change an effective numerical aperture of the objective lens.

5. The recording apparatus of claim 4, wherein the the liquid crystal is applied only at a position corresponding to the periphery of the objective lens, and the apparatus further comprises electrodes connected to the liquid crystal at the position so as to allow the controller to change the effective numerical aperture of the objective lens.

6. The recording apparatus of claim 2, wherein the light spot size adjuster comprises a liquid crystal having an adjustable transmittance, and the controller adjusts the transmittance to control the size of the light spot to change an effective numerical aperture of the objective lens.

7. The recording apparatus of claim 6, wherein the liquid crystal is applied only at a position corresponding to the periphery of the objective lens, and the apparatus further comprises electrodes connected to the liquid crystal at the position so as to allow the controller to change the effective numerical aperture of the objective lens.

8. The recording apparatus of claim 1, wherein the objective lens is controllable to change the size of the light spot, and
    the controller controls the objective lens so that, when recording on the rewritable recording medium, the size of the light spot is the first size.

9. The recording apparatus of claim 1, wherein, when recording on the rewritable recording medium, the controller defocuses the objective lens to increase the size of the light spot.

10. The recording apparatus of claim 1, wherein the rewritable recording medium is a phase-change recording medium.

11. The recording apparatus of claim 10, wherein the rewritable recording medium is one of a rewriteable Compact Disc (CD-RW), a rewriteable Digital Versatile Disc (DVD-RW, DVD+RW, DVD-RAM), and a rewriteable next generation DVD having a higher density than a Digital Versatile Disc (DVD),
    the write once recording medium is one of a CD-R, a DVD-R optical disc, and a recordable next generation DVD, and
    the recording medium further comprises a reproduction only disc including one of a CD, a DVD, and a next generation DVD.

12. The recording apparatus of claim 1, wherein the first size light spot for the rewriteable recording medium is larger than a size of a light spot for reproducing from the rewriteable recording medium.

13. A method of recording on a rewritable recording medium using an optical pickup having a light source to emit a light and an objective lens to focus the light as a light spot on a recording surface of a recording medium family, the method comprising:
    forming a first size of the light spot formed on a recording surface when recording on a rewritable recording medium, the first size being larger than a second size formed when recording on a write once recording medium and/or when reproducing from the recording medium family,
    wherein the recording medium family comprises any recording media having a common thickness with the rewriteable recording medium.

14. The method of claim 13, wherein the forming the first size light spot comprises:
    using a light spot size adjuster of the optical pickup to change the size of the light spot, and controlling the light spot size adjuster to form the first size light spot when recording on the rewritable recording medium.

15. The method of claim 13, wherein the forming the first size light spot comprises:
using the objective lens to change the size of the light spot, and
controlling the objective lens to form the first size light spot when recording on the rewritable recording medium.

16. The method of claim 13, wherein the forming the first size light spot comprises defocusing the objective lens to form the first size light spot when recording on the rewritable recording medium.

17. The method of claim 13, wherein the rewritable recording medium is a phase-change recording medium.

18. The method of claim 17, wherein the rewritable recording medium is one of a rewriteable Compact Disc (CD-RW), a rewriteable Digital Versatile Disc (DVD-RW, DVD+RW, DVD-RAM), and a rewritable next generation DVD having a higher density than a Digital Versatile Disc (DVD).

19. The method of claim 13, wherein the first size of the light spot is larger than a size of a light spot formed when reproducing from the rewriteable recording medium.

20. An apparatus for recording and/or reproducing a mark on a recording medium, the apparatus comprising:
an optical pickup having a light source to emit a light beam and an objective lens to focus the emitted light beam to form a light spot on a recording surface of the recording medium, the optical pickup being controllable to change a size of the light spot formed on the recording surface; and
a controller to control the optical pickup to form a first size light spot when recording data on the recording medium, and to form a second size light spot which is other than the first size light spot when reproducing data from the recording medium.

21. The apparatus of claim 20, wherein the optical pickup further comprises a variable aperture device which adjusts a numerical aperture of the objective lens so as to selectively form the first and second size light spots.

22. The apparatus of claim 21, wherein the variable aperture device comprises:
a first region usable for recording and reproducing data with respect to the recording medium, and
a second region surrounding the first region and which is controllable to adjust the numerical aperture according to whether the first or second size light spot is to be formed.

23. The apparatus of claim 22, wherein the second region includes a liquid crystal having a controllable transmittance to adjust the numerical aperture.

24. The apparatus of claim 22, wherein the variable aperture device is disposed on the objective lens.

25. The apparatus of claim 20, wherein the optical pickup further comprises an actuator which moves the objective lens to selectively form the first and second size light spots.

26. The apparatus of claim 25, wherein the actuator is controllable to defocus the objective lens so as to selectively form the first and second size light spots.

27. The apparatus of claim 20, wherein:
the recording medium is a rewriteable recording medium, and
when another non-rewriteable recording medium is received by the apparatus and has a common thickness with the rewriteable recording medium, the controller controls the optical pickup to record and/or reproduce with respect to the another non-rewriteable recording medium using the second size light spot.

28. The apparatus of claim 20, wherein the first size light spot is larger than the second size light spot.

29. An optical pickup for use in an apparatus for recording and/or reproducing a mark on a recording medium, the optical pickup comprising:
a light source to emit a light beam;
an objective lens to focus the emitted light beam to form a light spot on a recording surface of the recording medium; and
a light spot adjusting device which is controllable to change a size of the light spot formed on the recording surface between a first size light spot and a second size light spot according to whether data is being recorded or reproduced with respect to the recording medium.

30. The optical pickup of claim 29, wherein the light spot adjusting device adjusts a numerical aperture of the objective lens so as to selectively form the first and second size light spots.

31. The optical pickup of claim 30, wherein the light spot adjusting device comprises:
a first region usable for recording and reproducing data with respect to the recording medium, and
a second region surrounding the first region and which is controllable to adjust the numerical aperture according to whether the first or second size light spot is to be formed.

32. The optical pickup of claim 31, wherein the second region includes a liquid crystal having a controllable transmittance to adjust the numerical aperture.

33. The optical pickup of claim 31, wherein the light spot adjusting device is disposed on the objective lens.

34. The optical pickup of claim 29, further comprising an actuator which moves the objective lens to selectively form the first and second size light spots.

35. The optical pickup of claim 34, wherein the actuator is controllable to defocus the objective lens so as to selectively form the first and second size light spots.

36. The optical pickup of claim 29, wherein:
the recording medium is a rewriteable recording medium, and
for another non-rewriteable recording medium having a common thickness with the rewriteable recording medium, the optical pickup forms the second size light spot so as to record and/or reproduce data with respect to the another non-rewriteable recording medium.

37. The optical pickup of claim 29, wherein the first size light spot is a recording light spot and the second size light spot is a reproducing light spot and the first size light spot is larger than the second size light spot.

* * * * *